C. C. WILSON.
BUILDING MATERIAL.
APPLICATION FILED JAN. 2, 1920.
1,413,819. Patented Apr. 25, 1922.
3 SHEETS—SHEET 1.
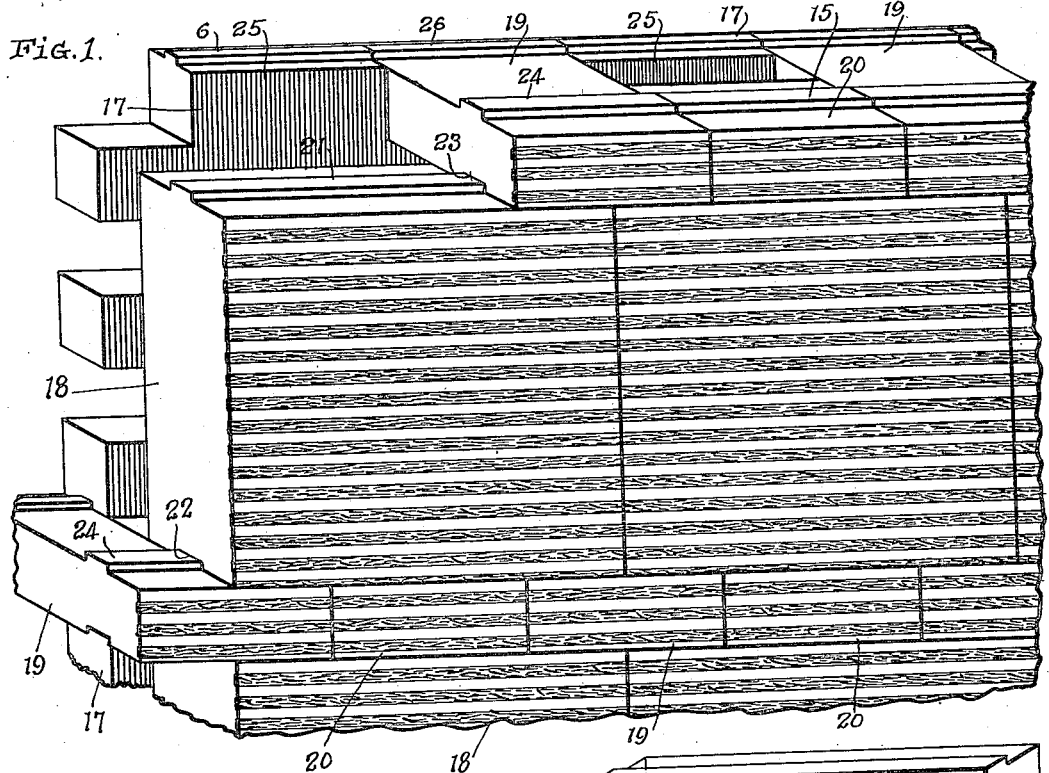
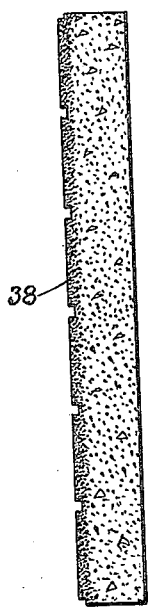
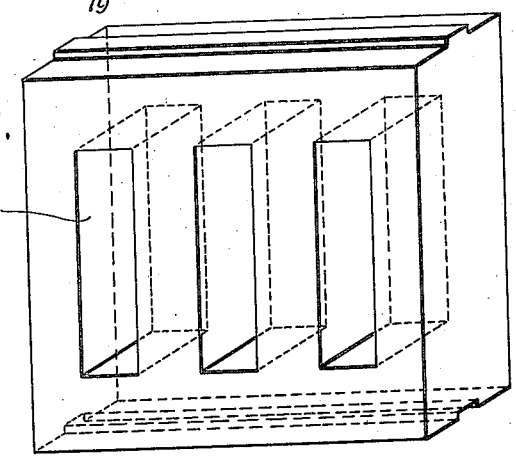
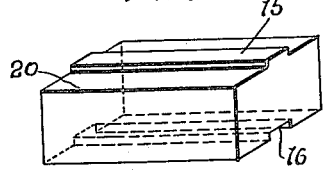
INVENTOR.
Charles C. Wilson,
BY Toulmin & Toulmin,
ATTORNEYS C. C. WILSON.
BUILDING MATERIAL.
APPLICATION FILED JAN. 2, 1920.
1,413,819.
Patented Apr. 25, 1922.
3 SHEETS—SHEET 2.
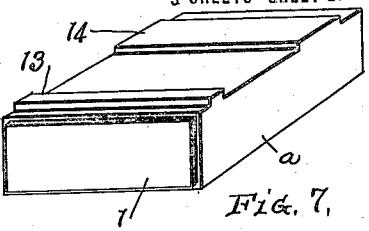
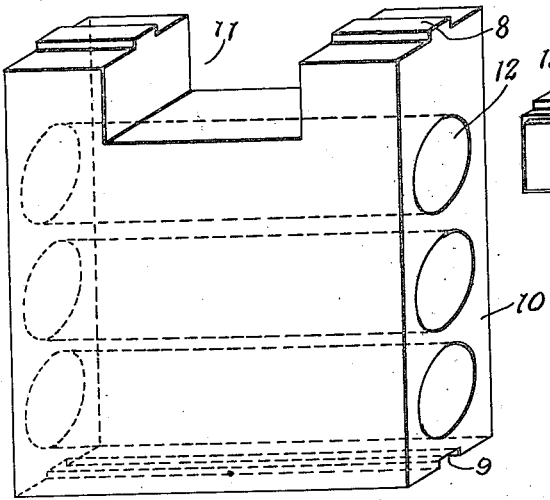
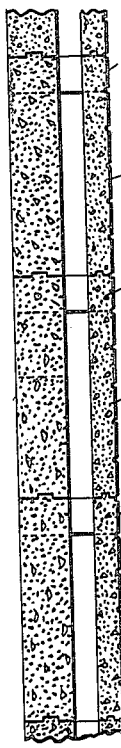
INVENTOR.
Charles C. Wilson,
BY Toulmin + Toulmin,
ATTORNEYS.

C. C. WILSON.
BUILDING MATERIAL.
APPLICATION FILED JAN. 2, 1920.
1,413,819. Patented Apr. 25, 1922.
3 SHEETS—SHEET 3.
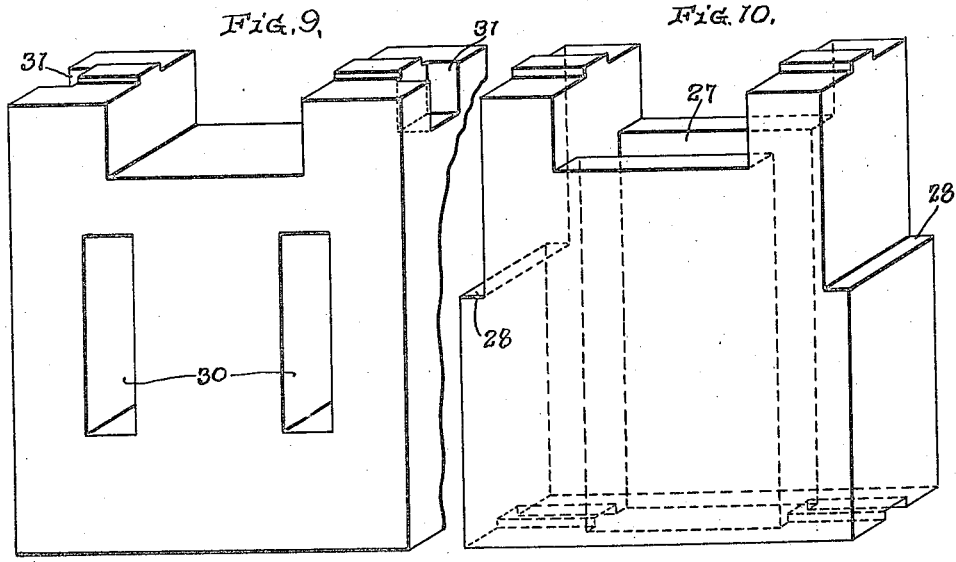
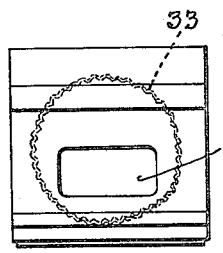
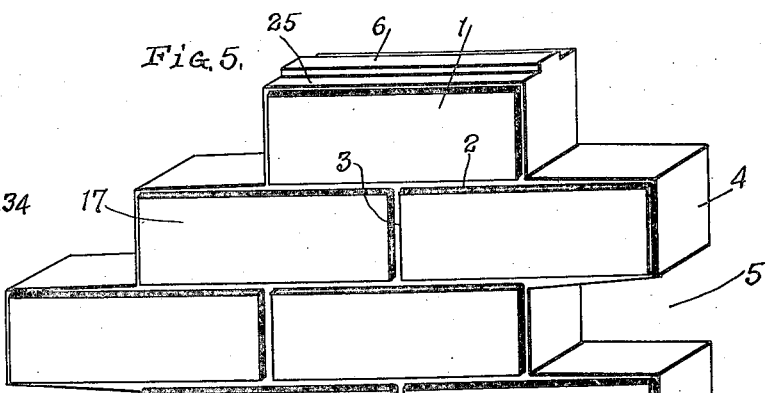
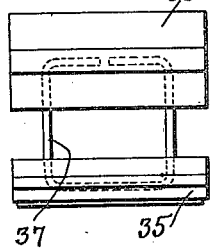
INVENTOR.
Charles C. Wilson,
BY Toulmin & Toulmin,
ATTORNEYS

UNITED STATES PATENT OFFICE.

CHARLES C. WILSON, OF DAYTON, OHIO.

BUILDING MATERIAL.

1,413,819.  Specification of Letters Patent.  Patented Apr. 25, 1922.

Application filed January 2, 1920. Serial No. 348,911.

*To all whom it may concern:*

Be it known that I, CHARLES C. WILSON, a citizen of the United States, residing at Dayton, in the county of Montgomery and State of Ohio, have invented certain new and useful Improvements in Building Materials, of which the following is a specification, reference being had therein to the accompanying drawing.

This invention relates to building material and has for its particular object to provide suitable building blocks made of cement or ceramic materials and adapted to be constructed into a wall which in its outer effect will have the general appearance and qualities of a wall constructed of brick or stone in the usual manner, the invention in this respect being a modification and improvement of the building veneer blocks shown in my copending application for Letters Patent, Serial No. 304,240, filed June 14, 1919.

In the present invention it is a further object to provide suitable blocks for constructing a double wall, that is to say, a wall consisting of inner and outer walls suitably bonded together to form a substantial structure and having air spaces there between thus providing an effective insulation against heat, cold and dampness. These air spaces may be left open at the top of the wall to form ventilating spaces or may be closed to form dead air spaces between the walls, or may be only partially closed, and have live air spaces provided at suitable places in the wall.

It is a purpose of the invention to provide the building blocks of which the outer walls are to be constructed with outer water-proof surfaces, having an intermixture of pigment to give the blocks the desired color to agree with the color of brick or other material.

The water-proofed, color surfaces are formed while the material of which the blocks are made is still in plastic condition in the mold, by working the exposed surface down with a strike-off tool which serves at the same time to mark off the surface of the block to the size of bricks or other building units.

Where the surface of the block has been properly prepared by the above described treatment, a mixture of neat cement and color material is spread over the surface and is thoroughly worked into the surface to form the water-proofing of the material and to give it the desired color effect. As the surface of the block is thus treated a considerable portion of the moisture of the plastic material exudes to the surface, and is scraped off, the cement and color pigment, being thoroughly worked into the material, varying from a sixteenth to an eighth of an inch or more as may be required for different grades of blocks. Thus the surface of the blocks, when the same are dried, becomes very hard and impervious to the action of moisture and will not be subject therefore to the deteriorating affects of the weather thereon, and the coloring of the blocks, being part of the materal, will likewise be indestructible.

It is an object of the invention to adapt the blocks of the inner and outer walls to each other so that the opposite walls may be interlocked or bonded together in such a manner that one wall serves to reinforce the other, the two walls thus being in effect a single rigid wall made up of the inner and outer tiers of the building blocks, spaced apart, interlocked and properly aligned with each other to form the wall structure.

With respect to aligning of the blocks one with the other of the separate walls, this is accomplished by an arrangement of tongue and groove formations on the adjoining edges of the blocks, the blocks being thus self-aligning in setting-up of the wall. The opposite walls are aligned one with the other by the bonding blocks which are also tongued and grooved and which serve when placed in the wall to properly space the walls apart, and align and interlock one wall with the other.

The blocks here shown for constructing the outer walls may also be used independently of the inner wall, as a veneer wall for an inner wood or frame structure in the general manner shown in my copending application for patent above referred to, the blocks of the present invention however having certain herein described improvements which distinguish them from my earlier inventions. Thus the blocks may be used for re-siding an old wood-frame building, or for siding a new wood or steel frame building, the improvement in either case being made at low cost with little or no maintenance cost upon the walls after the same are constructed.

A further advantage of the present invention, as in my earlier invention above referred to, consists in the adaptability of the blocks for local production in any community where common building sand is found, thus minimizing production and shipping costs and affording decided advantages relative to deliveries, etc.

It is obvious of course that walls constructed of this material will not be harmfully affected for an indefinite time by conditions of climate, or the weather, or other deteriorating conditions or causes which ordinarily must be considered in determining the character of materials to be used in structural work.

The relatively low cost therefore of raw materials, and construction of the block, of labor in erecting walls of the material, and in maintenance, thereof make the blocks a preferred building material, these advantages being of special importance in view of the rapidly increasing cost of wood, brick and other building materials. Furthermore skilled labor is not required to erect walls constructed of this material, as the blocks are practically self-aligning and can therefore be set-up in a wall by common or unskilled labor and therefore at relatively lower cost.

In common with walls constructed of other cement, ceramic or stone materials, walls constructed of the improved building blocks of this invention are vermin proof, being more effective, however, in this respect than is usually the case in masonry constructed with the ordinary building units because of the greatly reduced joint areas and the more substantial juncture between the blocks. Rats, mice and other vermin will thus be effectually excluded from buildings constructed of the improved material, the walls in all respect being unusually substantial and practically vermin proof.

Other features of improvements will be apparent from the herein detailed description and the accompanying drawings which illustrate details of the invention in several forms of preferred construction, the novelty of the invention being set forth in general and specific terms and in various combinations in the appended claims.

In the drawings:

Fig. 1 is a perspective view of a detail of wall constructed of the improved building material, and showing the manner of bonding or interlocking the inner and outer walls.

Fig. 2 is a side elevation of a detail of wall construction showing the manner of interlocking the blocks of the outer wall one with the other, and other features of both the inner and outer wall construction.

Figs. 3 and 4 are plan and sectional views respectively of details of the double wall structure.

Fig. 5 is a side elevation of a preferred form of block for the outer wall construction.

Fig. 6 is a side elevation of a preferred form of block for the inner wall construction.

Fig. 7 is a perspective view of a preferred form of bonding or interlocking block for the inner and outer walls.

Fig. 8 is a transverse vertical sectional view of the block shown in Fig. 5.

Figs. 9, 10 and 11 are modified forms of blocks for the inner wall, having suitable apertures therein to receive the ends of joist or other portions of the inner wood or steel frame structure of the building of which the walls form a part.

Fig. 12 is a detail view of one form of spacing block for the inner wall interposed between the interlocking blocks, and Figs. 13 and 14 are detailed views of two suitable forms of reinforced bonding blocks.

As shown in Fig. 5 of the drawings, the block unit of the outer wall, in the form here shown, consists of an integral block having its outer face divided into faces 1, spaced apart by longitudinal and vertical depressions 2—3 to represent brick or other individual building units of smaller size. At its opposite vertical edges the block is provided with alternate projections and spaces 4—5 adapted to be interlocked with corresponding edges of horizontally adjacent blocks; the projections 4 and spaces 5 being tapered as here shown to adapt the abutting edges to form the juncture more readily when the blocks are set up in the wall.

The upper and lower edges of the block as here shown are provided respectively with a tongue 6 and groove 7 which serve to align the blocks, one with another in the wall and to prevent lateral displacement thereof. The blocks may be of any suitable size for convenient handling and may have any number of face spaces of suitable design defined thereon.

In Fig. 6 a preferred form of block for the inner wall is illustrated. As here shown the block is provided at its upper and lower edges respectively with a tongue and groove 8 and 9 which serve the same purpose as the corresponding features of the blocks for the outer walls above described. The vertical edges 10 are here shown flush, that is to say without projections for forming interlocking joints with horizontally adjacent blocks. In the upper edge of the block a rectangular-shaped depression 11 is formed to receive one end of the bonding block for interlocking the inner and outer walls. Extending longitudinally through the block is a plurality of apertures 12 which serve the double purpose of lightening the blocks and effecting a substantial saving of material. The apertures also aid materially to insulate the walls against heat, cold and moisture.

In Fig. 7 a preferred form of bonding block is shown, consisting of a suitable block adapted to be set horizontally in the wall, one end of the block fitting into a space 11 of the inner wall, and the opposite or outer end fitting into the outer wall, thus serving to bond or interlock the walls one with the other. The bonding block as here shown is provided on its upper face with tongues 13 and 14 which correspond in width and height with the tongues 6 and 8 respectively of the outer and inner blocks and are aligned therewith when the blocks are assembled in the wall.

In Fig. 12, a suitable spacing block is shown for the inner wall in one form of construction. This block has formed on its upper and lower faces respectively a tongue and groove 15 and 16 which are aligned with and conform to corresponding features of adjacent blocks in the wall.

In Fig. 1 of the drawings a section of wall is illustrated constructed of the four kinds of blocks above described, the bonding blocks and blocks of the inner wall being, however, of modified construction. As here shown the wall is built up of the outer blocks 17, inner blocks 18, bonding blocks 19 and spacing blocks 20, the blocks of the respective walls being aligned one with another with their side faces flush by means of the tongues and grooves in their horizontal edges, and the opposite walls being spaced apart and aligned, one with the other by the bonding blocks 19.

The inner blocks 18 as here shown are straight-sided and have their vertical edges butting one against another. On their upper horizontal edges the blocks have tongues 21 and on their lower edges grooves 22 adapted respectively to co-operate with grooves 23 and tongues 24 of the bonding blocks 19. At their outer ends the bonding blocks fit between two opposite vertical projections 25 of the blocks 17, being provided on the upper face with a tongue 26 aligned with the tongues 6 of blocks 17.

As shown in Fig. 1 the blocks are set up in the wall in even tiers or in parallel courses, the horizontal junctures of each wall running uniform and substantially in the same plane with the horizontal junctures of the opposite wall. The bonding blocks at their inner ends span the vertical joints between opposite blocks of the inner wall and at their opposite ends the dove-tail joints between opposite blocks of the outer wall and thus make the interlocking of the blocks and of the opposite walls more effective. It will also be observed that the tongue and groove formation for each tier of blocks is uniform or continuous, and that the tongue projection is upward and the groove therefore open downwardly, thus serving to more effectually exclude moisture from the joints.

The interlocking joints between the blocks of the outer wall are best shown in Fig. 2 of the drawings, the joints marked a—b—c indicating where the interlocking junctures are made, the blocks marked 19 indicating the position of the bonding blocks at the junctures between two adjacent blocks 17.

A cross section of the wall shown in Fig. 2 is shown in Fig. 4. The detail of inner wall shown illustrates a wall constructed of a modified form of block shown in detail in Fig. 10. This type of block has the tongue and groove features and space for the bonding block described in connection with Fig. 6. The block is formed hollow, having a vertical space 27 extending therethrough as distinguished from the horizontal spaces 12 of the block shown in Fig. 6, but for the same purpose, i. e. to minimize the weight of the block and to economize in the use of material. The block is also provided with opposite shoulders 28 which serve, when the blocks are set up in the wall, to form spaces 29 adapted to receive the ends of joist or other timbers of the inner frame structure of the building.

In setting up the wall a coating of mortar or thin cement mixture is applied to the joint surfaces which serves to make the joints air and moisture proof. The joints exposed on the outer wall are dressed or finished with a jointing tool to correspond to the spaces 2 and 3, a colored mortar or cement being used preferably to agree with the color face of the blocks and to make the joints indistinguishable from the face spacings of the block.

In Figs. 9 and 11 other modified forms of blocks for the inner wall are shown. The block illustrated in Fig. 9 has timber spaces 30, and bonding spaces 31, the bonding spaces being adapted when the blocks are set up in the wall to be filled with cement, or with cement and reinforcing strips of steel to securely bond adjacent blocks longitudinally. The block shown in Fig. 11 is of the same general type as the blocks 18 shown in Fig. 1, with the addition of the timber spaces 32.

In Figs. 13 and 14 two forms of reinforced bonding blocks are shown, the block illustrated in Fig. 13 being formed integrally and reinforced by a ring of steel or wire binder 33, and having an air space 34 extending therethrough. The block shown in Fig. 14 consists of two sections 35 and 36 bonded together by a steel binder 37 thus serving to provide increased space between the opposite sections of the block and to keep the space between the inner and outer walls open.

Fig. 8 is a vertical cross sectional view of an outer building block 17. It will be observed that the outer portion 38 of the block is formed as here shown of finer material, this being the water-proofing and color material added to the block in the finishing thereof as herein referred to.

While no apparatus is shown for producing the building blocks herein described it will be understood that for quantity production of the improved material suitable apparatus for economic manufacturing is contemplated. Thus the blocks may be produced in standard shapes and sizes, or according to specifications, and at low cost.

From the illustrations of the drawings and the foregoing detailed description the construction and utility of the building blocks will be readily understood. It will be seen that a high grade building material may be thus provided at low cost and that walls of unusually substantial construction, and being equal in appearance to regular brick or stone walls, may be set up therewith by common or unskilled labor, therefore at low cost. The importance of the invention, in view of the present high and rapidly increasing cost of wood and other materials, is self-evident and its influence on the building trades are of far reaching possibilities.

While a preferred form of construction is here shown it will be understood that various modifications relative to the details of construction and arrangement may be made without departing from the general features of the invention as defined and comprehended in the appended claims.

Having thus fully described my invention, what I claim as new and desire to secure by Letters Patent, is:—

1. In a wall structure, the combination, of an inner and outer wall constructed respectively of block units set up in aligned tiers and having an insulating space therebetween, the blocks of the inner wall having spaces provided therein for supporting frame timbers, and the blocks of the outer wall having faces formed thereon representing building units of smaller dimensions, and bonding blocks spanning opposite joints between adjacent blocks to interlock the walls.

2. In a wall structure, the combination, of an inner and outer wall constructed respectively of block units set up in aligned tiers and having an insulating space therebetween, the tiers of the inner wall being of less height than the tiers of the outer wall, and the blocks of the outer wall forming intermittent vertical projections and spaces and bonding blocks fit into the spaces of the outer wall and co-operating with the tiers of the inner wall to increase the height thereof equal to the height of the tiers of the outer wall.

3. In a wall structure, the combination, of an inner and outer wall constructed respectively of block units set up in aligned tiers and having an insulating space therebetween, the tires of the inner wall being of less height than the tiers of the outer wall, and the blocks of the outer wall forming intermittent vertical projections and spaces and bonding blocks fit into the spaces of the outer wall and co-operating with the tiers of the inner wall to increase the hight thereof equal to the height of the tiers of the outer wall, and filler blocks disposed between the bonding blocks on the inner wall.

Intestimony whereof, I affix my signature.

CHARLES C. WILSON.